US010586361B2

(12) United States Patent
Sharma et al.

(10) Patent No.: US 10,586,361 B2
(45) Date of Patent: Mar. 10, 2020

(54) MESH ART POSITIONING TECHNIQUES AS PART OF DIGITAL CONTENT CREATION

(71) Applicant: Adobe Inc., San Jose, CA (US)

(72) Inventors: Avadhesh Kumar Sharma, Jhunjhunu (IN); Ashish Ranjan, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/852,536

(22) Filed: Dec. 22, 2017

(65) Prior Publication Data
US 2019/0197746 A1  Jun. 27, 2019

(51) Int. Cl.
G06T 11/60 (2006.01)
G06F 3/0482 (2013.01)
G06F 3/0484 (2013.01)
G06T 11/00 (2006.01)

(52) U.S. Cl.
CPC ............ *G06T 11/60* (2013.01); *G06F 3/0482* (2013.01); *G06F 3/04845* (2013.01); *G06T 11/001* (2013.01)

(58) Field of Classification Search
None
See application file for complete search history.

(56) References Cited

U.S. PATENT DOCUMENTS

| 8,566,721 | B2* | 10/2013 | Langmacher | G06F 3/04845 |
| | | | | 345/473 |
| 8,731,876 | B2* | 5/2014 | Carr | G06F 17/50 |
| | | | | 345/419 |
| 8,917,284 | B2* | 12/2014 | Finch | G06T 11/203 |
| | | | | 345/442 |
| 9,607,422 | B1* | 3/2017 | Leedom | G06T 15/00 |
| 2003/0020710 | A1* | 1/2003 | Biermann | G06T 17/20 |
| | | | | 345/420 |
| 2013/0124149 | A1* | 5/2013 | Carr | G06F 17/50 |
| | | | | 703/1 |
| 2013/0127856 | A1* | 5/2013 | Winnemoeller | G06T 17/20 |
| | | | | 345/423 |
| 2014/0267253 | A1* | 9/2014 | Lipp | G06T 17/20 |
| | | | | 345/420 |
| 2016/0140689 | A1* | 5/2016 | Lux | H04N 19/93 |
| | | | | 345/420 |
| 2018/0005455 | A1* | 1/2018 | Wenzel | G06T 19/20 |

* cited by examiner

Primary Examiner — Peter Hoang
(74) Attorney, Agent, or Firm — SBMC

(57) ABSTRACT

Mesh art positioning techniques as part of digital content creation by a graphics editing application of a computing device are described. The graphics editing application is configured to obtain lists of vertices that are used to form mesh art. This list may then be used by a snapping module of graphics editing application to generate a snap point list that is used as a basis for mesh art positioning in relation to other objects within an item of digital content. Techniques are also described to address color diffusion within the mesh art, such as to identify a vertex that is a source of color diffusion and a boundary of color diffusion within the mesh art. The source and/or outer boundary of color diffusion within the mesh is then used as a basis to control mesh art positioning by the graphics editing application.

20 Claims, 12 Drawing Sheets

MESH ART POSITIONING TECHNIQUES AS PART OF DIGITAL CONTENT CREATION

BACKGROUND

Graphics editing applications as executed by a computing device include a variety of tools, with which, a creative user may interact via a user interface to create digital content, such as digital images, vector graphics, and so forth. An example of this is a snapping module, which is configured to aide positioning of objects within an item of digital content in relation to each other. This may include snapping behaviors in which an item of digital content is "snapped" to particular locations by the graphics editing application, output of visual guides to align objects in relation to each other, spacing of objects in relation to each other, and so on.

Conventional graphics editing applications define the relationships between these objects based on an outer border of the objects or a center point of the objects. This may be used by the graphics editing applications, for instance, to align tops of the objects to each other, space objects based on a center point of the objects, and so on. While this may look visually pleasing for objects having a relatively uniform color, these techniques often fail for objects having a diffused color in which a source of the diffused color does not correspond to the outer border or center point.

In one such example, mesh art is formed from a collection of vertices. A source of diffused color may be defined using one of these vertices, which is then diffused through the mesh to form a gradient. If the source is offset from a center or border of the mesh, however, alignment based on the center or border of the mesh art may look disjointed. Accordingly, conventional techniques used by graphics editing applications to aide placement, when confronted with mesh art having diffused color, often fail thus forcing creative user to make a "best guess" as how to manually align objects. This problem is further exacerbated by difficulties of a creative user in manually determining an actual source of the diffused color in the mesh art in an accurate manner.

SUMMARY

Mesh art positioning techniques as part of digital content creation by a graphics editing application of a computing device are described. The graphics editing application is configured to obtain lists of vertices that are used to form mesh art. This list may then be used by a snapping module of the graphics editing application to determine mesh art positioning in relation to other objects and vice versa within an item of digital content. The mesh art positioning, for instance, may include snapping behaviors, alignment, and/or spacing.

Techniques are also described to address color diffusion within the mesh art, such as to identify a vertex that is a source of color diffusion and a boundary of color diffusion within the mesh art. The source and/or outer boundary of color diffusion within the mesh is then used as a basis to control mesh art positioning by the graphics editing application. The graphics editing application, for instance, may snap, align, and/or space mesh art in relation to other objects in an item of digital content based on the source of diffused color and/or a boundary of the diffused color within the mesh art. In this way, these positioning techniques overcome limitations of conventional techniques that are limited to a center point of outer boundary through use of vertices of the mesh and colors at respective vertices.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
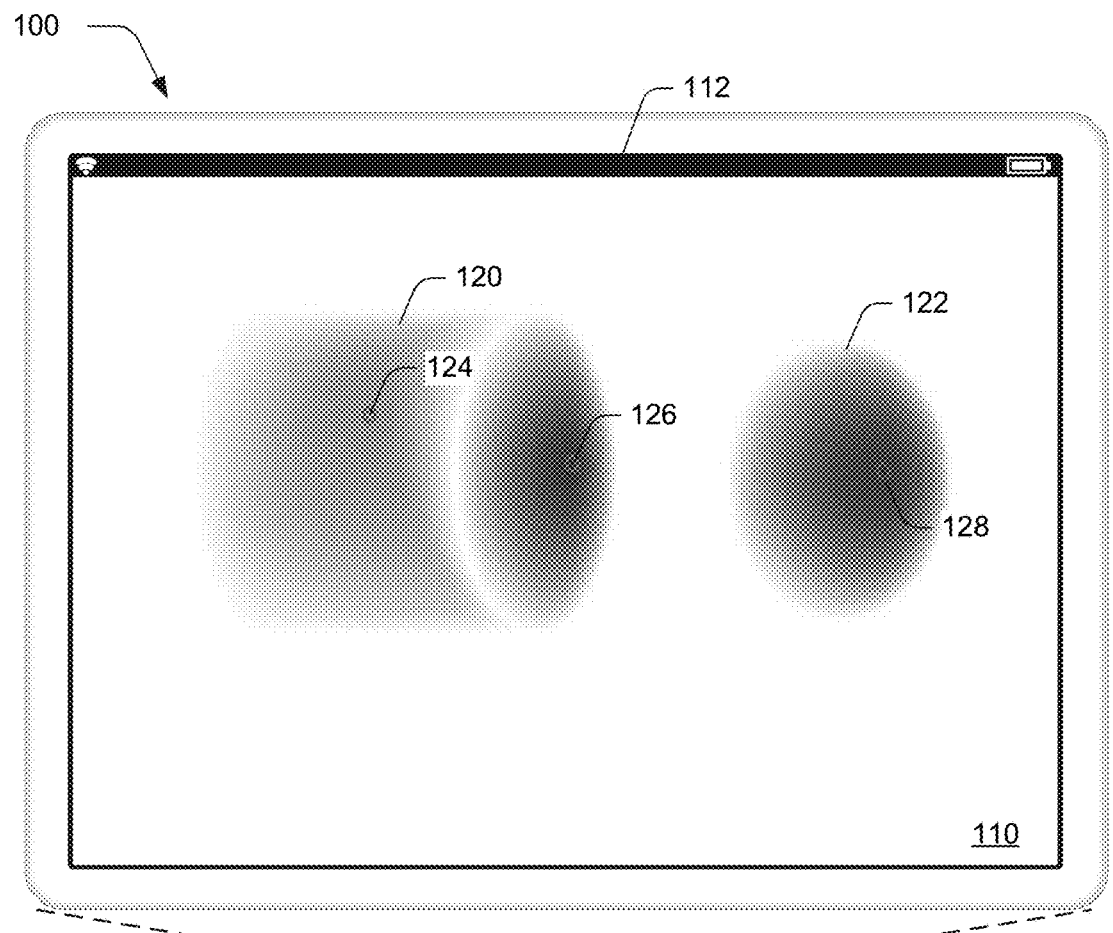
FIG. 1 is an illustration of an environment in an example implementation that is operable to employ positioning techniques for digital content generation as described herein.
Figure 1:
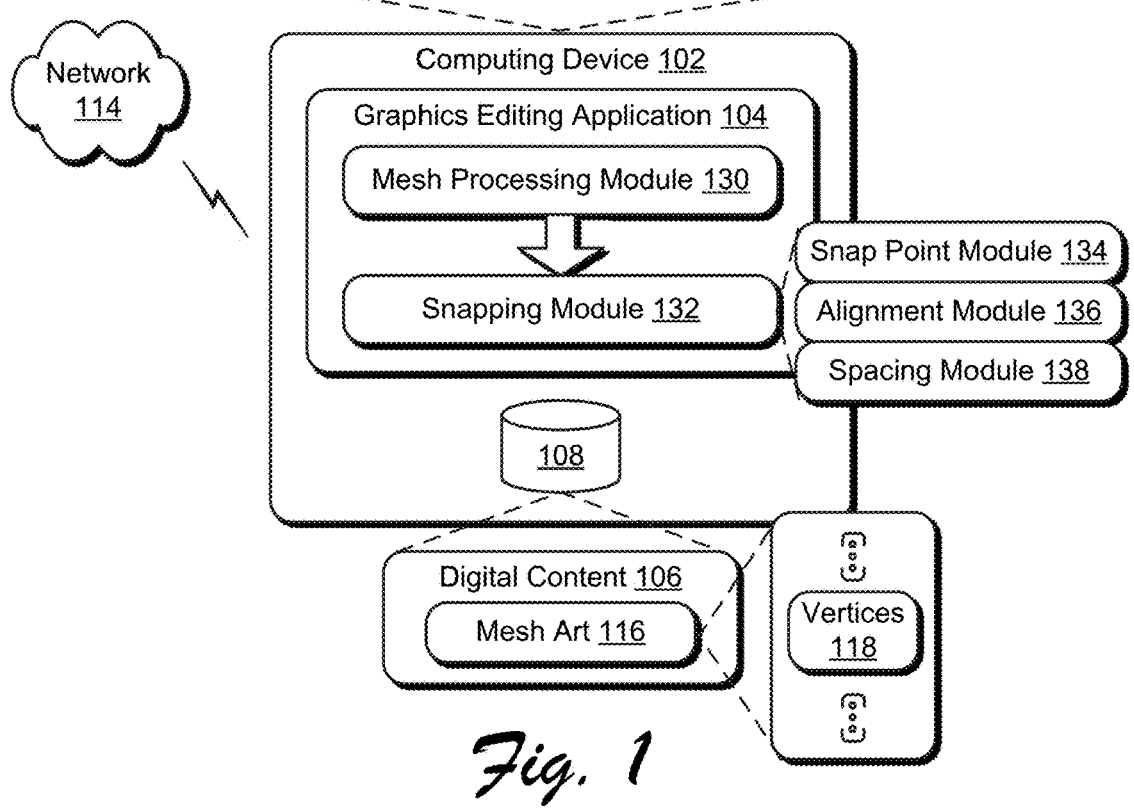

One of the challenges in creation of digital content by a graphics editing application is to make the digital content appear natural. This is typically performed in the graphics editing application through use of mesh art in which a source of color is defined using a vertex in a mesh, from which, color is diffused to other vertices in the mesh. This may be used, for instance, to give an appearance of a gradient of the color in the mesh art to mimic real world objects.

As previously described, conventional techniques used by graphics editing applications to aide positioning of objects within an item of digital content often fail when confronted with mesh art with diffused color. This is because a source of the diffused color in the mesh art may not align with locations used by these conventional techniques as a basis to aide positioning, such as a center and/or outer border of the art. In one example, conventional techniques used to space objects based on borders of the objects may appear uneven when color is not also diffused in the objects based on the borders. Thus, conventional techniques used to aid positioning by the computing device may appear unnatural. This also hinders operation of the computing device by forcing a user to initiate repeated operations of the computing device manually to perform this positioning and repositioning, thereby consuming additional resources of the computing device and resulting in user frustration.

Accordingly, mesh art positioning techniques are described that may be employed by a computing device as part of digital content creation. These techniques support positioning based on vertices within mesh art, and thus do not suffer from limitations of conventional techniques that are based solely on a center or outer border of an object. To do so, a mesh processing module of a graphics editing application calls a mesh application programming interface (API) to determine if an item of digital content includes mesh art. If so, the mesh processing module obtains data via the mesh API that describes vertices used to define a mesh of the mesh art, e.g., as a collection to two-dimensional coordinates and edges that connect those coordinates to form a two-dimensional topology of the mesh art.

The mesh processing module then generates a snap point list from the vertices described in the data. In one example, the snap point list includes each of the vertices, such that positioning techniques employed by a snapping module may be based on any one of the vertices. In another example, the snap point list includes a number of the vertices that is below a threshold, such as a number selected from the plurality of vertices that are disbursed evenly in the mesh. In a further example, the snap point list includes vertices that are at least a minimum distance apart. In this way, vertices of the mesh art may be used by a snapping module that receives the snap point list via an API from the mesh processing module to control positioning of objects and the mesh art in relation to each other, such as to employ snap points, alignment, and/or spacing.

In yet another example, the snap point list is generated to address color diffusion within the mesh art. The mesh processing module, for instance, may receive the data describing the vertices as previously described via the mesh API. This data may also define whether respective vertices are assigned a color. The mesh processing module may then determine, from this data, which of the vertices are assigned a color and an intensity of the assigned color. From this, the mesh processing module may also determine a source of diffused color across the vertices of the mesh art from the vertex having the highest color intensity for a particular color. The mesh processing module may also determine a boundary of the diffused color in the mesh art. In other words, determine "how far" the color is diffused from the source within the mesh art. From this, a snap point list is then generated that identifies a source of the diffused color and/or boundary of the diffused color in the mesh art.

A snapping module that obtains this snap point list may then employ a variety of techniques to aide positioning of objects as part of creating an item of digital content. This may include positioning of an object in relation to the mesh art and/or mesh art in relation to the object, which may also be configured as mesh art, binary art, and so forth. In one example, this includes a snapping behavior such that placement of an object or the mesh art itself near a snap point, defined by the snap point list, causes the object and/or the mesh art to be repositioned in a user interface to the snap point automatically and without user intervention by the snapping module.

In another example, alignment techniques are used in which visual guides are output in a user interface by the snapping module to indicate the source and/or boundaries of color diffusion within the mesh art. This may be used, for instance, to guide positioning of an object by a user in relation to mesh art based on the visual guides to align an object to the source and/or boundary of diffused color of the mesh art, or vice versa. This functionality may also be included as part of a snapping behavior as described above to "snap to" locations in the user interface defined by the visual guides to align the object and the mesh art to each other when within a defined proximity.

In a further example, spacing techniques are used by the snapping module to space an object in relation to the mesh art. This may be based on boundaries of diffused color and/or a source of the diffused color as specified by the snap point list. As a result, spacing of the mesh art follows color as viewed by a user and thus appears natural when rendered in a user interface. Further, this may be performed automatically and without user intervention by the graphics editing application to support real time user interaction. This acts to improve operational efficiency of the computing device that employs these techniques over conventional techniques that required repeated operations to achieve a desired result.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ mesh art placement techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 12.

The computing device 102 is illustrated as including a graphics editing application 104. The graphics editing application 104 is implemented at least partially in hardware of the computing device 102 to process and transform digital content 106, which is illustrated as maintained in a storage device 108 of the computing device 102. Such processing includes creation of the digital content 106, modification of the digital content 106, and rendering of the digital content 106 in a user interface 110 for output, e.g., by a display device 112 and/or stored in the storage device 108. Although illustrated as implemented locally at the computing device 102, functionality of the graphics editing application 104 may also be implemented in whole or in part via functionality available via the network 114, such as part of a web service or "in the cloud."

The digital content 106 may take a variety of forms, including digital images that are rendered for output by the display device 112. In one example, the graphics editing application 104 is a vector graphics editor that is configured to generate the digital content 106 as vector graphics. Vector graphics are defined through the use of polygons to represent images in computer graphics. Vector graphics are based on vectors, which lead through vertices also referred to as control points or nodes that are defined using coordinates in two dimensions, e.g., X and Y axes to define a direction of a path. Vector graphics may be defined using a variety of standards, examples of which include Scalable Vector Graphics (SVG), Portable Document Format (PDF), Encapsulated PostScript (EPS), Windows Metafile (WMF), Vector Markup Language (VML), and so forth.

One example of vector graphics is mesh art 116 that is defined using a plurality of vertices 118 and edges (i.e., connections) between those vertices 118. Mesh art 116 may be configured as an object on which a color diffuses and transitions smoothly in a direction from one vertex to another. When creating mesh art 116 as part of interacting with the graphics editing application 104, connections referred to as "mesh lines" crisscross the mesh art 116, i.e., form edges between the vertices 118, that are used to manipulate color transitions on the mesh art 116. The vertices 118 define editing points of the mesh lines, via which, changes may be made to an intensity of a color shift as part of color diffusion or an extent of a colored area of the mesh art 116, i.e., a boundary of the diffused color.

The graphics editing application 104, for instance, may include a mesh tool that is user selectable via the user interface 110 to create the mesh art 116 as a vector object. The mesh tool is selected to add mesh points to define vertices 118 of the mesh art 116 and connections between the vertices. To do so, a user input may be received to define a location of a vertex 118 in the user interface as X and Y coordinates, e.g., by "clicking" on a location in a user interface 110 using a cursor control device or gesture. To delete the vertex 118, a user input may also be received to select and then delete the vertex, e.g., through use of an "Alt-click" in Windows® or "Option-click" in a MacOS® also using a cursor control device and key combination. Locations of the vertices 118 may be changed through a click-and-drag operation through use of a cursor control device or gesture to interact with the user interface 110, e.g., via touchscreen functionality. Mesh art 116 may also be created by the graphics editing application 104 by converting other types of art, e.g., from bitmap art using a vector graphics conversion tool.

Colors may then be added to the vertices 118 directly through selection of the vertices or indirectly to a mesh patch formed as a collection of vertices 118. An eyedropper tool, for instance, may be used to apply a selected color to a particular vertex 118, which may then diffuse to other vertices, if appropriate. In another instance, the eyedropper tool is used to apply color to a patch defined between a collection of vertices 118, together, which is then associated with the vertices 118 that form the collection to also diffuse outward from the point of selection.

The illustrated user interface 110 includes examples of rendered first and second items of mesh art 120, 122. As previously described, any of the vertices used to define the mesh art 116 may be used to specify a source, from which, color is diffused over a mesh. As such, conventional techniques used to aide positioning of mesh art in relation to other objects in an item of digital content 106, and vice versa, may fail when the source is not aligned with a border or center of the mesh art 116. Illustrated examples of this include first and second sources 124, 126 of diffused color for the first item of mesh art 120 that is cylindrical and a source 128 of diffused color for the second item of mesh art 122 that is an oval.

Accordingly, the graphics editing application 104 includes a mesh processing module 130 that is configured to process vertices 118 of the mesh art 116 into a form that may be addressed by a snapping module 132. This form enables the snapping module 132 to aide positioning of mesh art 116 to other objects in the digital content 106 and/or aid positioning of other objects in the digital content 106 in relation to the mesh art 116, e.g., bitmap objects.

Figure 4:
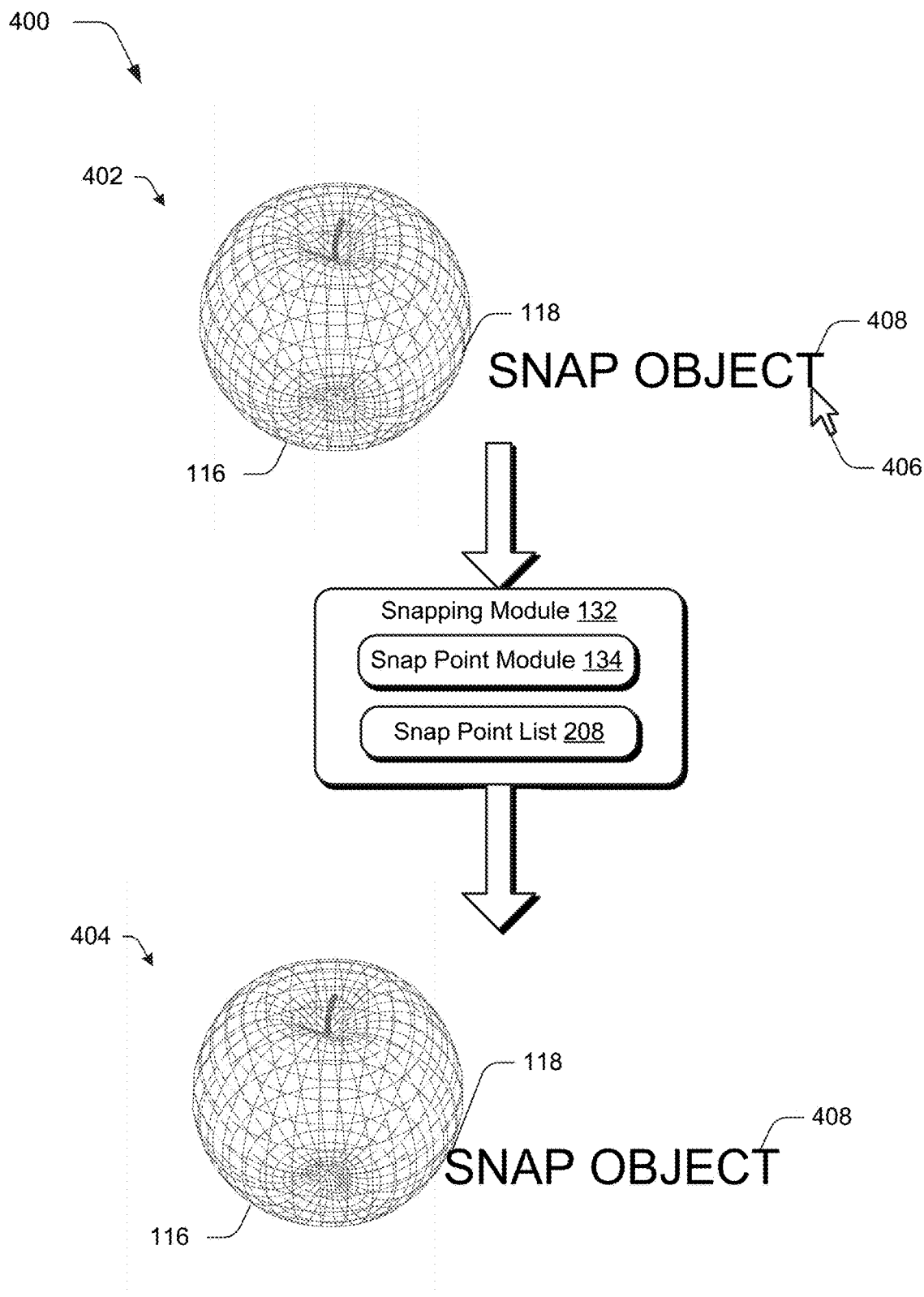
FIG. 4, for instance, depicts an example implementation of use of a snap point module of a snapping module of FIG. 1 to implement a positioning technique in which snap points are used to relocate an object and/or mesh art in a user interface.
Figure 8:
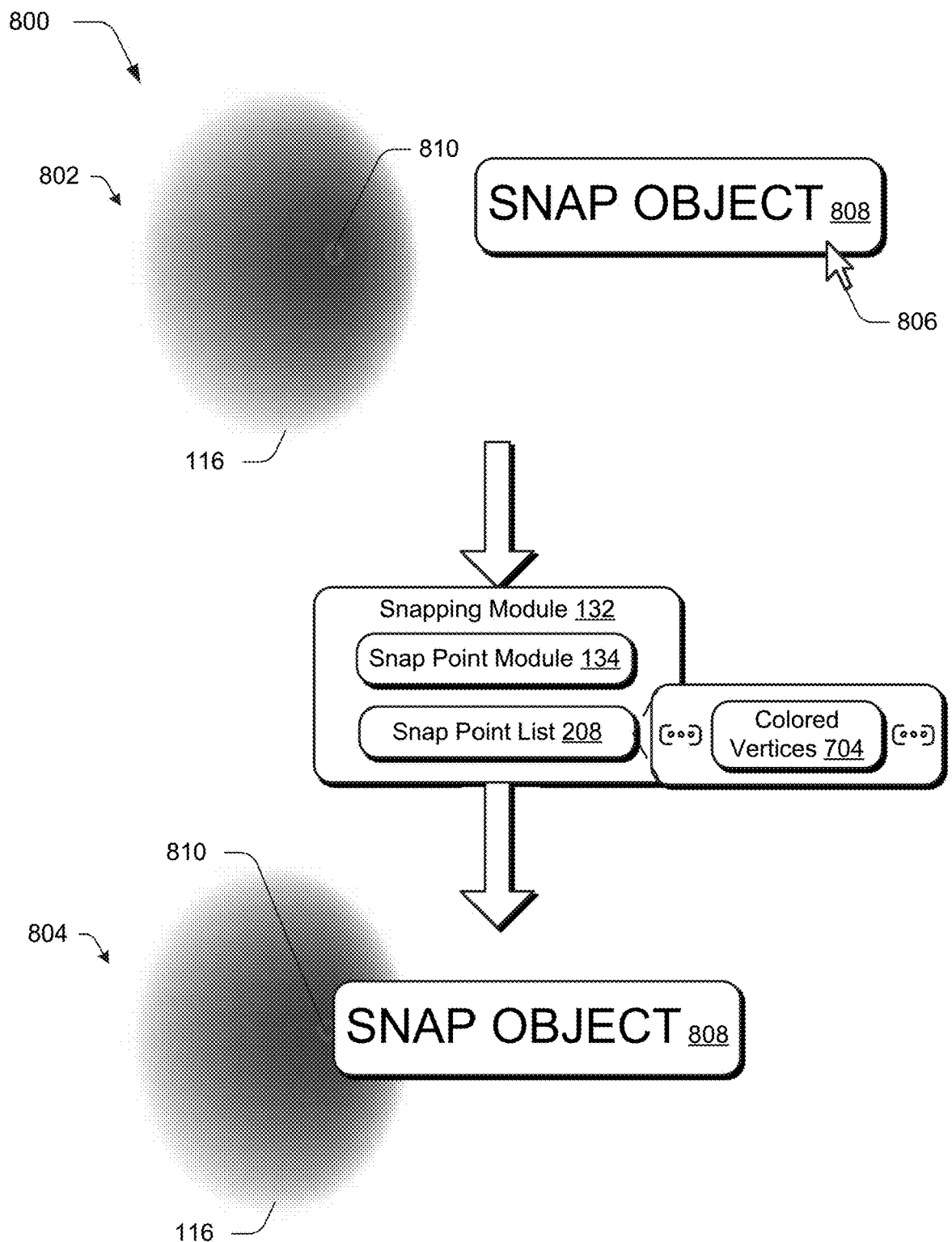
FIG. 8 depicts an example implementation of a positioning technique in which snap points are used to relocate an object and/or mesh art in a user interface based on a source of color diffusion within mesh art.

Examples of this include a snap point module 134 that is configured to use snap points based on the vertices 118 to automatically reposition the mesh art 116 or objects to the mesh art 116, as shown and discussed in relation to FIGS. 4 and 8. Another example includes an alignment module 136 configured to aid alignment of mesh art 116 and an object to each other, such as through use of a visual guide as shown and discussed in relation to FIGS. 5 and 9. A further example includes a spacing module 138 to control spacing between the mesh art 116 and another object as shown and discussed in relation to FIGS. 6 and 10. In this way, the mesh processing module 130 and snapping module 132 address the challenges of mesh art 116 and also diffused color within the mesh art. In the following discussion, examples of operation of the mesh processing module 130 begin with identification of vertices. Additional examples follow that leverage color as well as identification of vertices to address diffused color.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
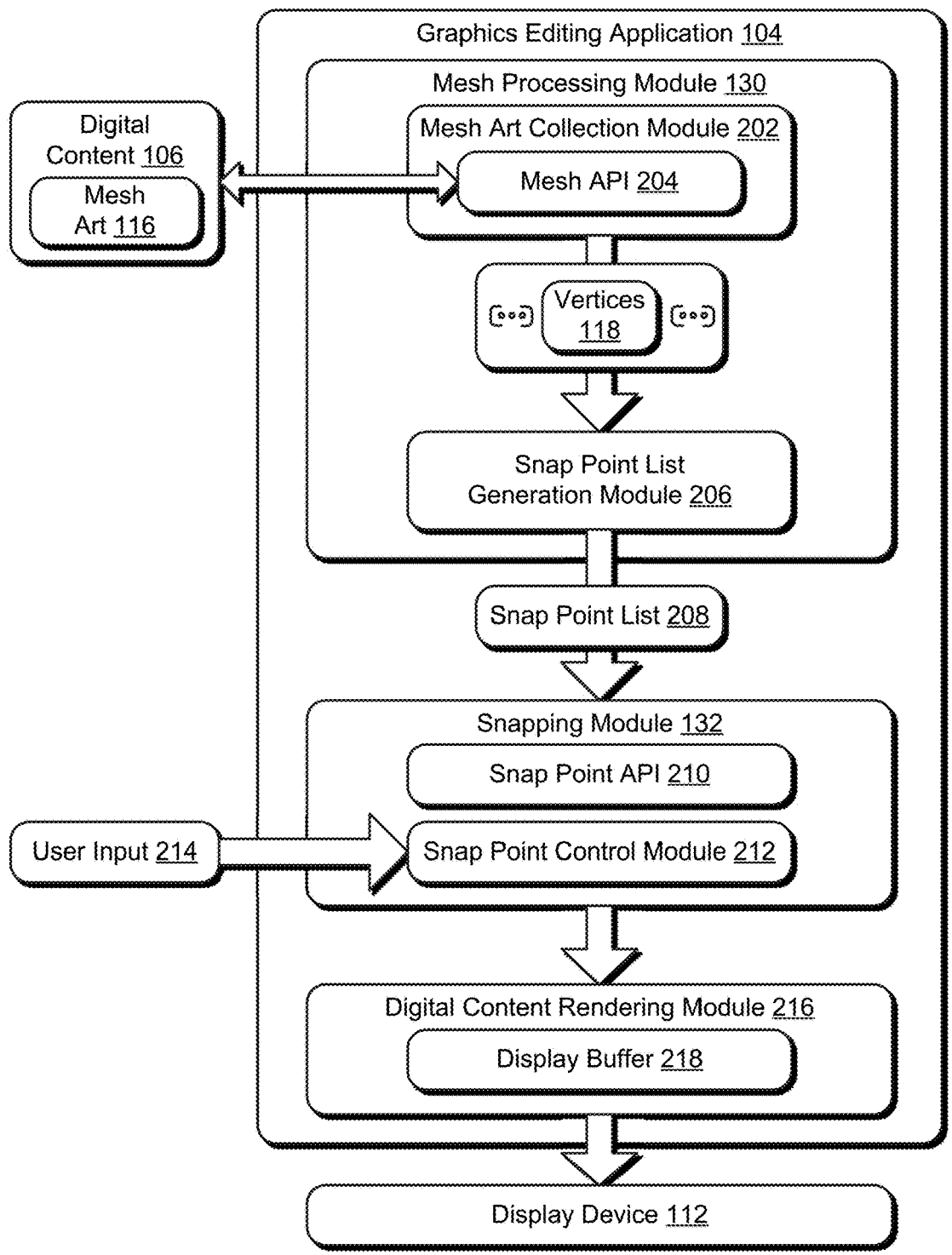
FIG. 2 depicts a system showing operation of a graphics editing application, mesh processing module, and snapping module in greater detail to support mesh art positioning techniques.
Figure 3:
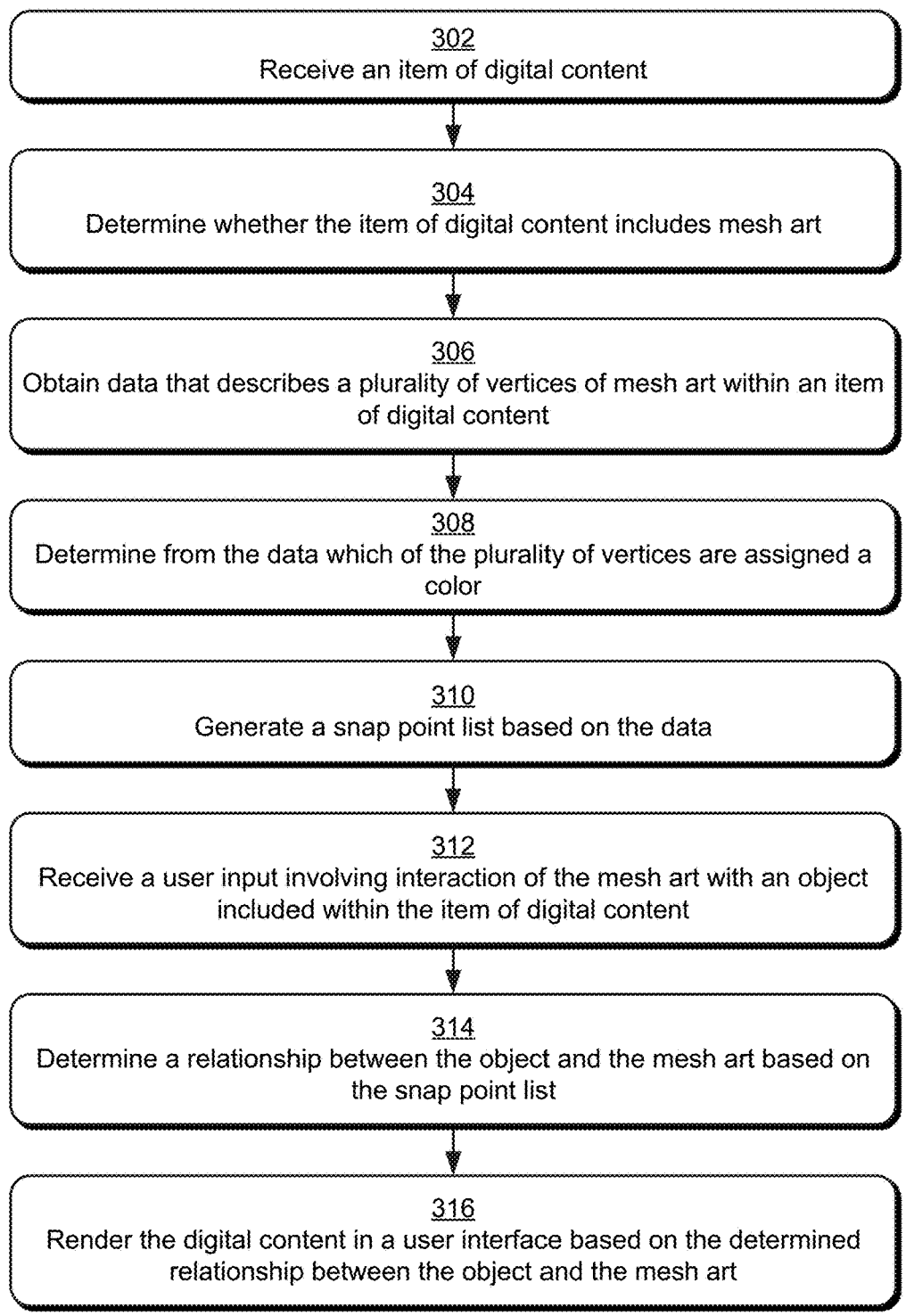
FIG. 3 is a flow diagram depicting a procedure in an example implementation of digital content rendering based on mesh art positioning techniques.

FIG. 2 depicts a system 200 showing operation of the graphics editing application, mesh processing module 130, and snapping module 132 in greater detail to support mesh art positioning techniques. FIG. 3 depicts a procedure 300 in an example implementation of digital content rendering based on mesh art positioning techniques.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In the following discussion, reference is made interchangeably to FIGS. 2-6.

To begin, an item of digital content 106 is received (block 302) by the graphics editing application 104. This may include opening (i.e., initiating execution) the digital content 106 from a storage device 106, initiating creation of a new item of digital content 106, and so forth. As previously described, the digital content 106 and graphics editing application 104 may take a variety of forms. In one example, the graphics editing application 104 is a vector graphics editor that is configured to generate the digital content 106 as vector graphics. Vector graphics are defined through the use of polygons to represent images in computer graphics. Vector graphics are based on vectors, which lead through locations typically referred to as control points or nodes that are defined using coordinates in two dimensions, e.g., X and Y axes to define a direction of a path. Vector graphics may be defined using a variety of standards, examples of which include Scalable Vector Graphics (SVG), Portable Document Format (PDF), Encapsulated PostScript (EPS), Windows Metafile (WMF), Vector Markup Language (VML), and so forth.

After obtaining the digital content 106, a determination is then made by the mesh processing module 130 as to whether the item of digital content 106 includes mesh art 116 (block 304). The mesh processing module 130, for instance, may employ a mesh art collection module 202 to access a mesh API 204. The mesh API 204 is configured to indicate whether the digital content 106 includes mesh art 116, e.g., by examining a data structure of the digital content 106. The mesh API 204 may also be used to obtain data from the mesh art 116 that describes characteristics of the mesh art 116, such as to indicate a plurality of vertices 118 and connections between the vertices that form the mesh art 116 (block 306). The data may also be used to describe colors assigned to the vertices 118 as further described in relation to FIGS. 7-11.

The data describing the vertices 118 is then passed from the mesh art collection module 202 via an API to a snap point list generation module 206. The snap point list generation module 206 is configured to generate a snap point list 208 based on the data (block 310). The snap point list generation module 206, for instance, is configured to translate the vertices 118 of the mesh art 116 into the snap point list 208 in a form that is compatible with the snapping module 132. The snap point list 208, once generated, is passed to a snapping module 132 via a snap point API 210 and used as a basis to support positioning techniques, such as spacing, snapping, alignment, and so on. Thus, the snap point list 208 may be employed by existing snapping modules 132 of the graphics editing application 104 without modification, thereby making these techniques applicable to a wide range of graphics editing applications 104 that already include snapping modules 132.

As previously described, conventional snapping modules are configured to support positioning techniques based on a center point or outer border of an object in an item of digital content. This is performed in conventional techniques by passing a snap point list that describes a location of this outer border or center point of the object. In the techniques described herein, however, the snap point list 208 is passed to the snapping module 132 that is based, at least in part, on vertices 118 of the mesh art 116 and thus may support additional functionality that is not possible using conventional techniques.

In one such example, the snap point list 208 includes each of the vertices 118 included in the mesh art 116. As a result, each of the vertices 118 in the mesh art 116 are usable as a basis for a positioning technique by a snap point control module 212. FIG. 4, for instance, depicts an example implementation 400 of use of the snap point module 134 of the snapping module 132 to implement a positioning technique in which snap points are used to relocate an object and/or mesh art in a user interface. This implementation 400 is illustrated using first and second stages 402, 404.

At the first stage 402, a user input 214 is received via a cursor control device to position a cursor to select an object 408 for positioning proximal to mesh art 116, illustrated as a mesh that forms an apple. Thus, the user input 214, involves interaction of the mesh art 116 with an object 408 included within an item of digital content (block 312), e.g., a digital image that includes text in this example.

From this, the snap point module 134 determines a relationship between the object 408 and the mesh art 116 based on the snap point list 208 (block 314). Thus, the relationship in this example may involve any of the vertices 118 that define the mesh art 116. The user input 214, for instance, may involve a click-and-drag operation in this example in which the object 408 is brought within a threshold distance of a vertex 118 of the mesh art 116. The relationship of the object 408 to the mesh art 116 causes the object to be repositioned (i.e., "snapped") by the snapping module 132 to the vertex 118 upon cessation of the input, e.g., by "releasing" the click, as shown at the second stage 404. This may be used, for instance, to snap a center point or outer border, overall, of the object 408 to the vertex 118.

Thus, in this example the object 408 may be "snapped" to any of the colored vertices 704 used to form the mesh art 116. The opposite scenario is also supported in which the mesh art 116 is moved to within a threshold distance of the object 408 such that the vertex 118 of the mesh art 116 is "snapped" to a snap point of the object 808.

Figure 5:
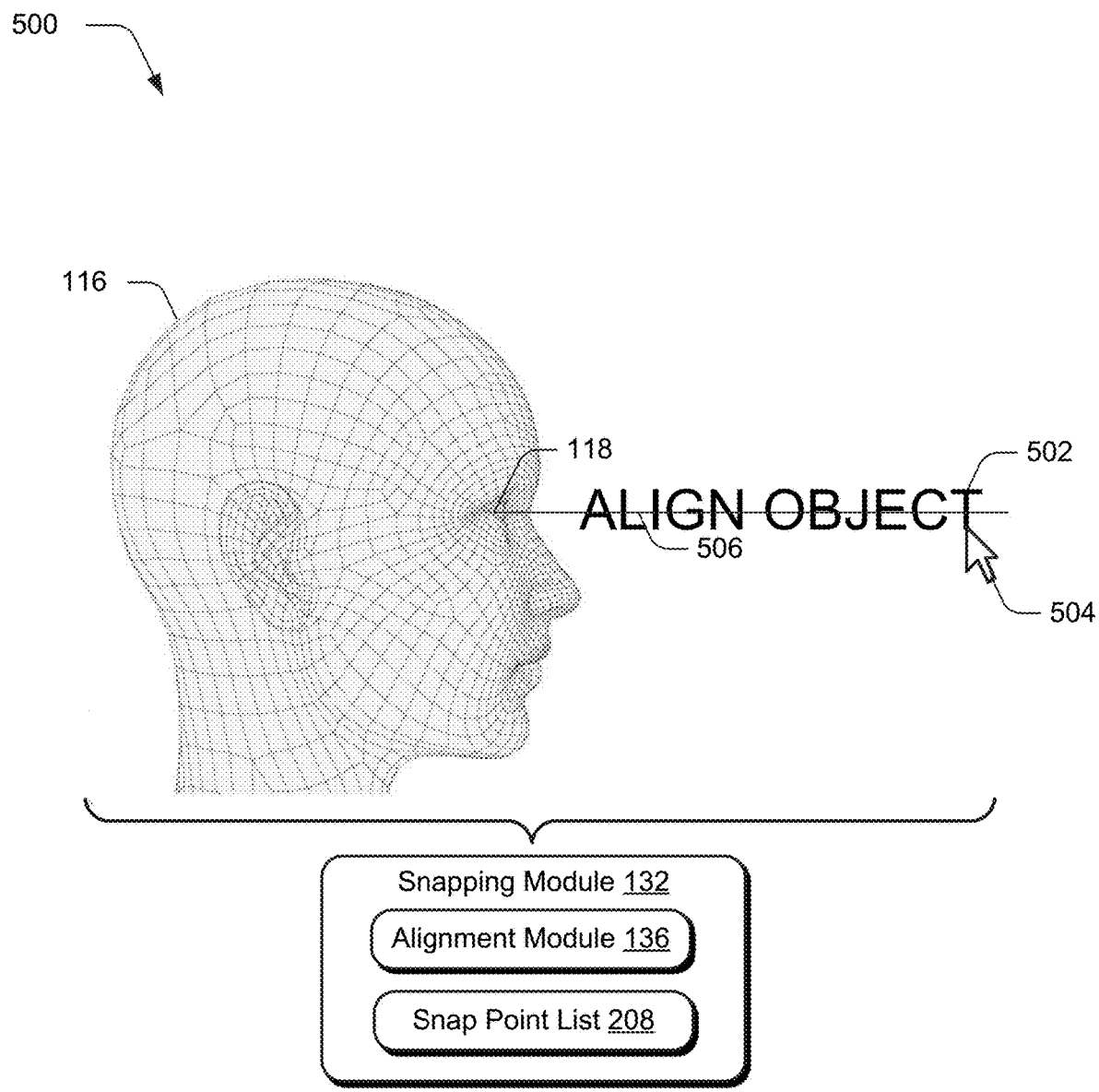
FIG. 5 depicts another example implementation in which an alignment module is used as a mesh art positioning technique as part of digital content creation.

FIG. 5 depicts another example implementation 500 in which an alignment module 136 is used as a mesh art positioning technique as part of digital content 106 creation. In this example, an object 502 is to be aligned in relation to mesh art 116, and in particular a vertex 118 of the mesh art 116. A user input, for instance, may be received via a cursor control device to select an object 502 using a cursor 504 and move the object to within a threshold distance of the vertex 118.

This causes output of a visual guide 506 by the alignment module 136 that may be used as a basis to align a portion of the object 502 to a corresponding vertex 118 of the mesh art 116, e.g., which defines an eye of a human head in the illustrated example. The visual guide 506, for instance, may be used to align a top, middle, bottom, left, center, or side of the object 504 defined by an outer border or center point of the object 504 in relation to the vertex 118. Snapping functionality may also be employed to "snap" the object 502 as aligned with the visual guide 506, when within a threshold distance. The visual guide 506 is then removed from the user interface upon completion of the user input, e.g., by releasing a button of a cursor control device, completion of a gesture by "lifting" a finger from a surface of the display device 112, and so forth. Other examples are also contemplated, such as to align items of mesh art to each other, i.e., when the object 504 is configured as mesh art, also.

Figure 6:
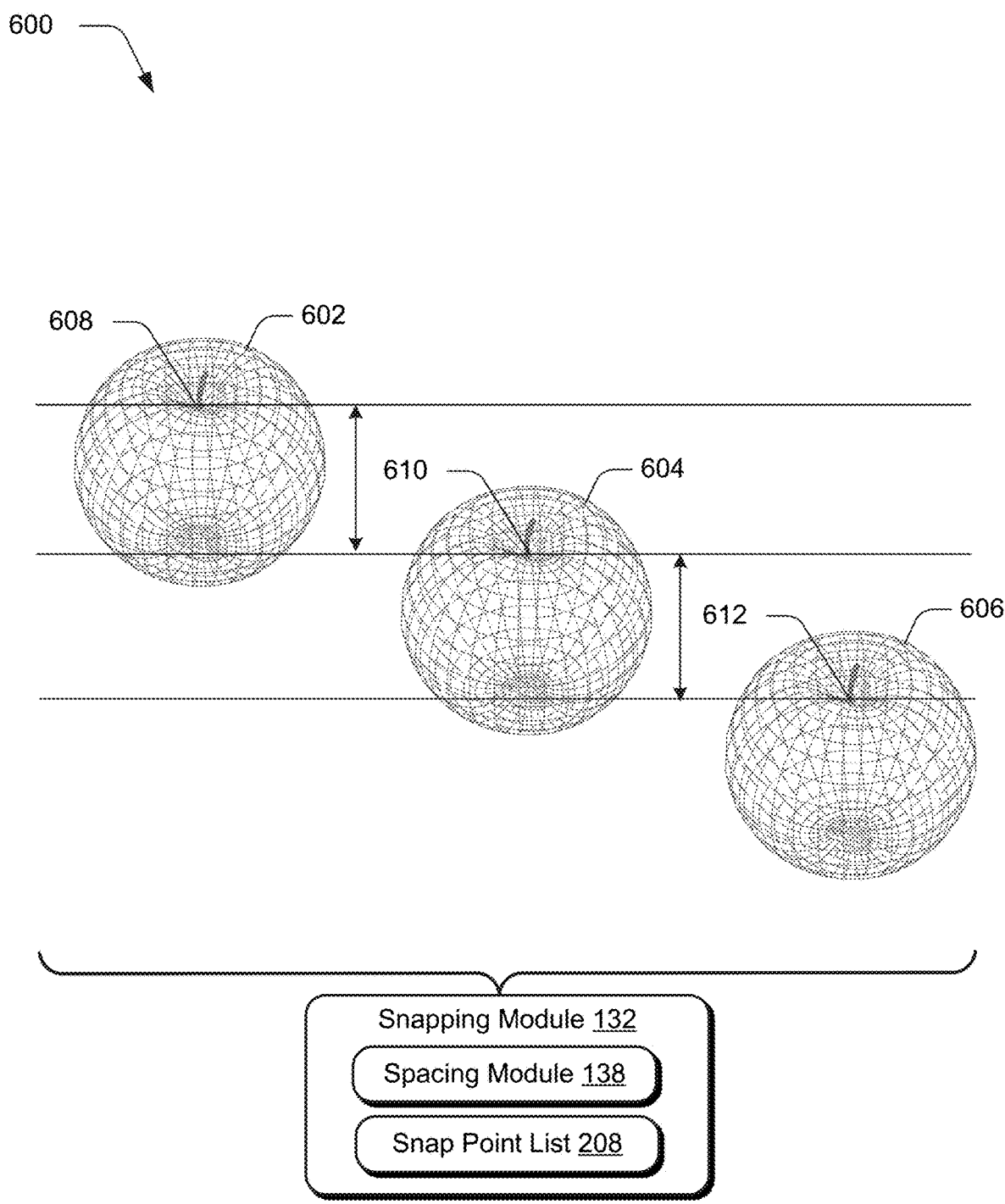
FIG. 6 depicts yet another example implementation in which a spacing module is used as a mesh art positioning technique as part of digital content creation.

FIG. 6 depicts yet another example implementation 600 in which a spacing module 138 is used as a mesh art positioning technique as part of digital content 106 creation. In this example, first, second, and third items of mesh art 602, 604, 606 are included in a user interface. A user input is received to select vertices 608, 610, 612 that are to be used as a basis by the spacing module 138 to space the mesh art 602, 604, 606 evenly in relation to each other, e.g., vertically as illustrated and/or horizontally.

In this way, the snap point list 208 provides additional options for the snapping module 132 over conventional techniques to snap, align, or space mesh art in relation to other objects, which may also be configured as mesh art. In some instances, the mesh art may include a multitude of vertices 118 that are positioned close to each other, which may make use of the positioning techniques challenging. Accordingly, in another example, the snap point list includes a number of the vertices that is below a threshold, such as a number selected from the plurality of vertices that are disbursed evenly in the mesh. In a further example, the snap point list includes vertices that are at least a minimum distance apart. In this way, the number of vertices used by the snap point list may and positioning of those vertices may configured to aid user interaction. These techniques may also be configured to take color diffusion within the mesh art into account, an example of which is described as follows and is shown in corresponding figures.

Figure 7:
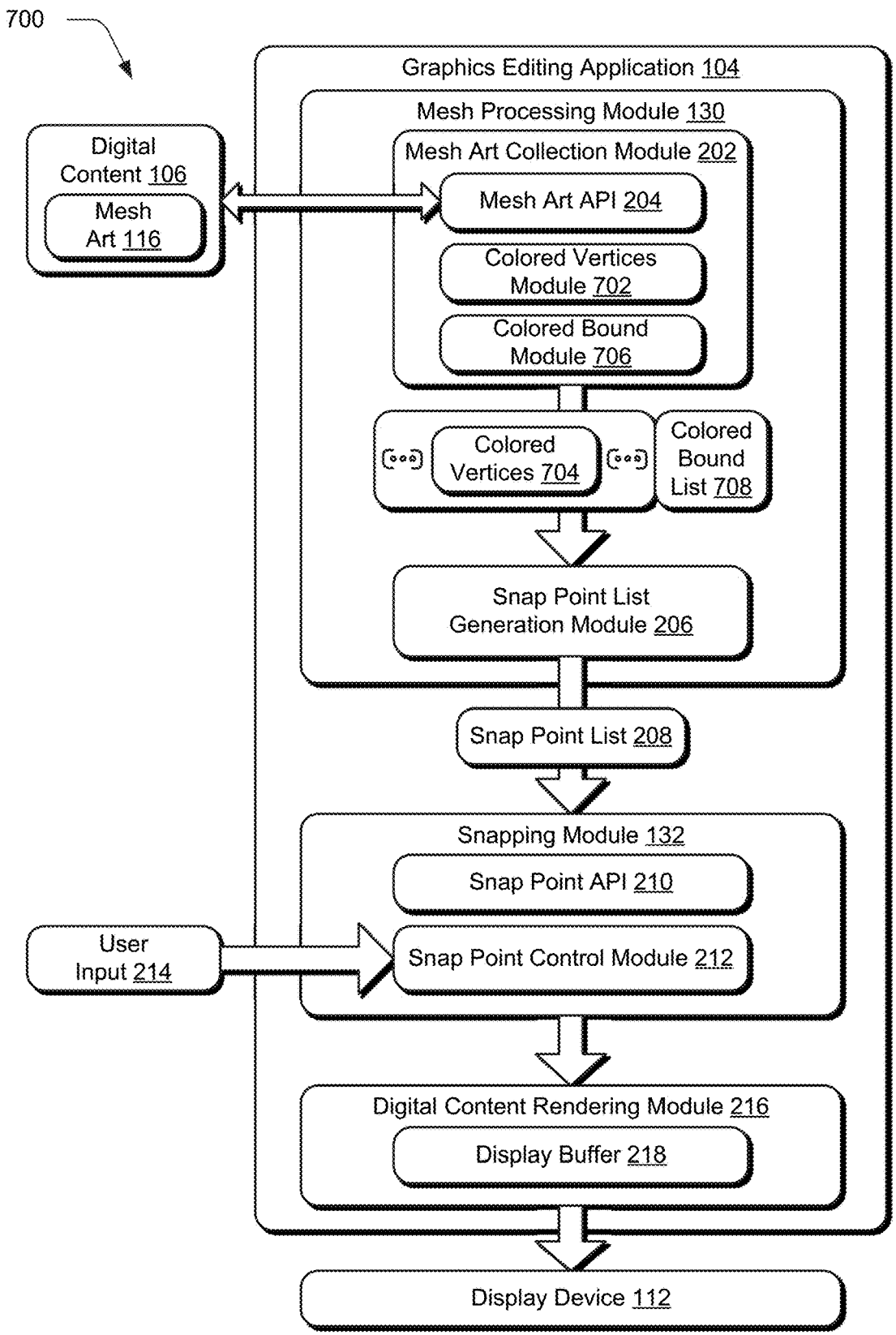
FIG. 7 depicts a system in an example implementation in which color is used as a basis to generate a snap point list to aid mesh art positioning techniques.

FIG. 7 depicts a system 700 in an example implementation in which color is used as a basis to generate the snap point list 208 to aid mesh art positioning techniques. Like before, the mesh processing module 130 accesses a mesh art API 204 to obtain data from digital content 106 describing vertices and connections of the vertices in mesh art of digital content 106. The mesh art collection module 202 in this example also obtains, from this data, information regarding colors used as part of the vertices. The mesh art collection module 202, for instance, may include a colored vertices module 702 which generates a list of colored vertices 704 in the mesh art 116. To do so, the colored vertices module 702 examines each of the vertices 118 in the mesh art 116, and if assigned a color, add that colored vertices 704 to a list which is then passed to the snap point list generation module 206. From this, the snap point list generation module 206 generations the snap point list 208 to include the colored vertices 704 and not un-colored vertices for use in positioning techniques by the snapping module 132.

In another instance, a colored bound module 704 generates a color bound list 708 to describe boundaries of diffusion of color within the mesh art 116. To do so, the colored bound module 706 obtains the list of colored vertices 704 from the colored vertices module 702. For each of the color vertices 704, the colored bound module 706 examines the four adjacent vertices 118 to determine if these vertices are also colored and may also be used to determine if it is a similar color to support use of multiple colors and diffusions within a single item of mesh art 116. This process continues until vertices 118 are encountered that are not colored or have a different color. Thus, the colored vertices 704 that are disposed adjacent to these uncolored or differently colored vertices form the outer bounds of color diffusion within the mesh art 118 as the colored bound list 708. From this, the snap point list generation module 206 generates the snap point list 208 based on the colored bound list 708. The color bound list 708, for instance, may specify the boundary using maximums coordinates in the X and Y directions in the mesh. As a result, the snapping module 132 may then base the mesh art positioning techniques on boundaries of color diffusion within the mesh art 116.

FIG. 8 depicts an example implementation 800 of use of the snap point module 134 of the snapping module 132 to implement a positioning technique in which snap points are used to relocate an object and/or mesh art in a user interface based on a source of color diffusion within mesh art 306. This implementation 800 is illustrated using first and second stages 802, 804.

At the first stage 802, like the example of FIG. 4, a user input 214 is received via a cursor control device to position a cursor 806 to select an object 808 for positioning proximal to mesh art 116. From this, the snap point module 134 determines a relationship between the object 408 and the mesh art 116 based on the snap point list 208, which is this instance is based on colored vertices 704 of the mesh art 116.

The user input 214, for instance, may involve a click-and-drag operation in this example in which the object 808 is brought within a threshold distance of a vertex 810 of the mesh art 116 that is a source of color diffusion within the mesh art 116. The relationship of the object 408 to the mesh art 116 causes the object to be repositioned (i.e., "snapped") by the snapping module 132 to the vertex 810 upon cessation of the input, e.g., by "releasing" the click, as shown at the second stage 804. This may be used, for instance, to snap a center point of the object 808 to the vertex 810 which is a source of color diffusion within the mesh art 116. Thus, in this example the object 808 is "snapped" to the source of color diffusion. The opposite scenario is also supported in which the mesh art 116 is moved to within a threshold distance of the object 808 such that the vertex 810 that is the source of color diffusion of the mesh art 116 is "snapped" to a snap point of the object 408. This may also be used through use of the colored bound list 708 such that a boundary of color diffusion within the mesh art 116 (but not necessarily an outer border of the mesh art 116) is used as a basis for snapping functionality. In other words, the colored bound list 708 includes colored vertices that define the outer boundary of color diffusion.

Figure 9:
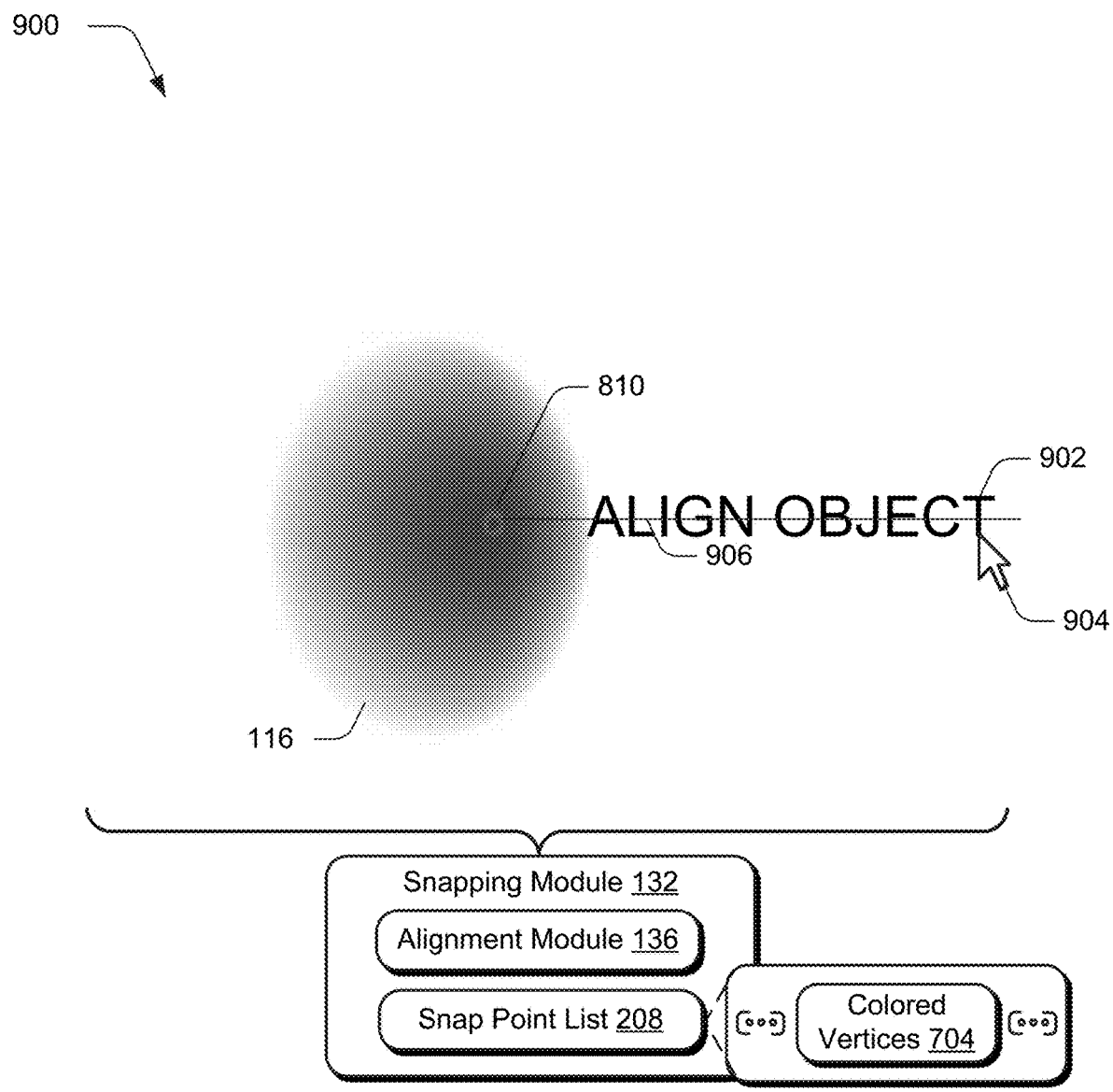
FIG. 9 depicts another example implementation in which an alignment module is used as a mesh art positioning technique as part of digital content creation to address color diffusion within mesh art.

FIG. 9 depicts another example implementation 900 in which an alignment module 136 is used as a mesh art positioning technique as part of digital content 106 creation to address color diffusion within mesh art 116. In this example, an object 902 is to be aligned in relation to mesh art 116, and in particular a vertex 810 of the mesh art 116 that is a source of diffused color within the mesh art 116. The snap point list 208, for instance, may identify the source of color diffusion based on a vertex that has the highest color intensity.

A user input is received via a cursor control device to select an object 902 using a cursor 904 and move the object 902 to within a threshold distance of the vertex 810 that is a source of diffused color. This causes output of a visual guide 906 by the alignment module 136 that may be used as a basis to align a portion of the object 902 to a corresponding vertex 810 of the mesh art 116 that is a source of diffused color. The visual guide 906, for instance, may be used to align a top, middle, bottom, left, center, or side of the object 902 defined by an outer border or center point of the object 902 in relation to the vertex 810. Snapping functionality may also be employed to "snap" the object 902 as aligned with the visual guide 906, when within a threshold distance. The visual guide 906 is then removed from the user interface upon completion of the user input. Other examples are also contemplated, such as to align items of mesh art to each other, i.e., when the object 902 is configured as mesh art, also, and also to use colored vertices 704 that define a boundary of color diffusion within the mesh art.

Figure 10:
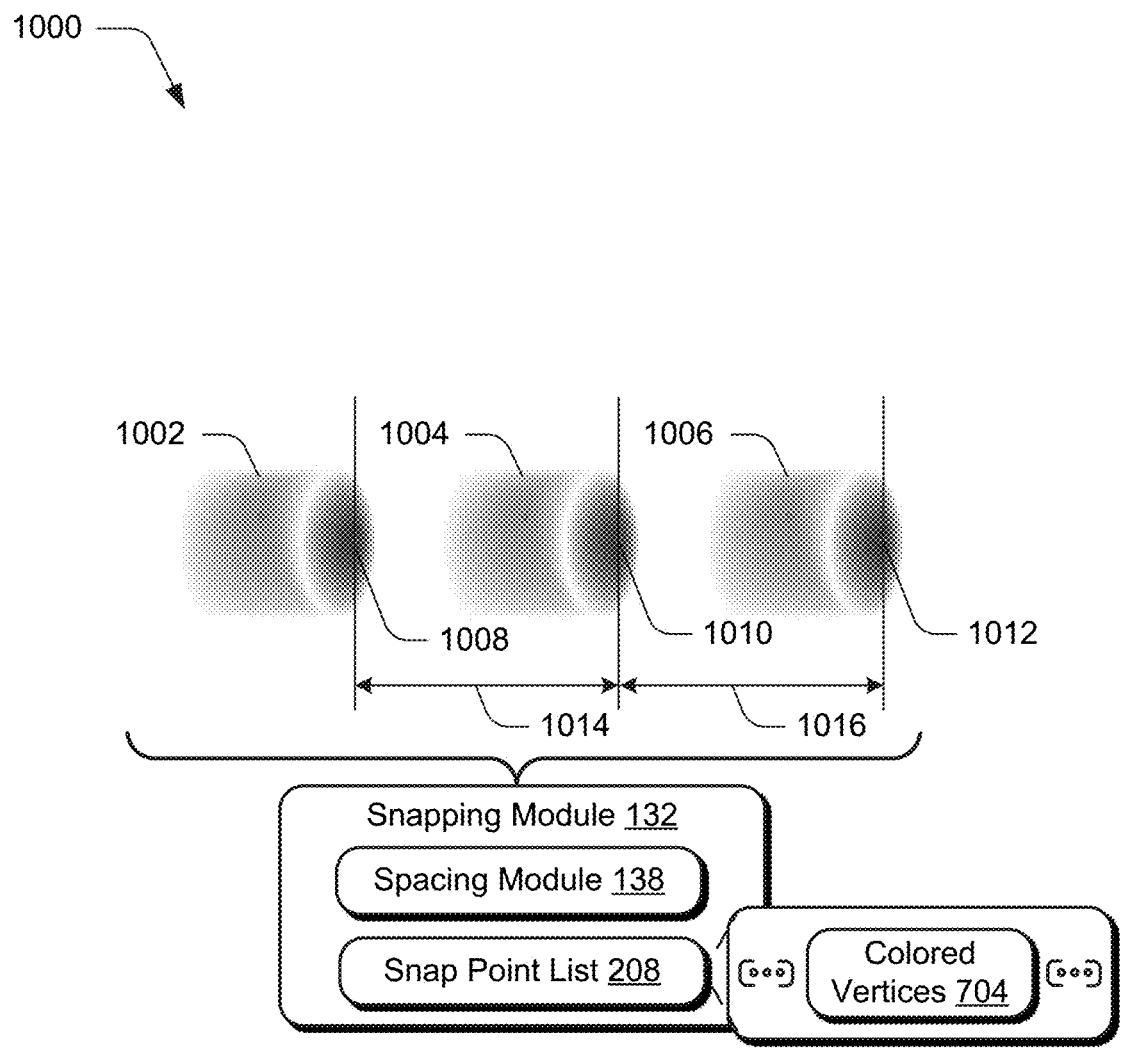
FIG. 10 depicts an example implementation in which a spacing module is used as a mesh art positioning technique as part of digital content creation based on a source of color diffusion within respective items of mesh art.

FIG. 10 depicts an example implementation 1000 in which a spacing module 138 is used as a mesh art positioning technique as part of digital content 106 creation based on a source of color diffusion within respective items of mesh art. In this example, first, second, and third items of mesh art 1002, 1004, 1006 are included in a user interface and selected via user input, e.g., by a "control-click," click-and-drag, and so forth.

A user input is then received by the spacing module 138 to space the items of mesh art 1002, 1004, 1006 horizontally based on respective sources 1008, 1010, 1012 of diffused color. The spacing module 138 then repositions one or more of the items of mesh art 1002, 1004, 1006 to achieve this spacing 1014, 1016. Other examples are also contemplated, including vertical spacing.

Figure 11:
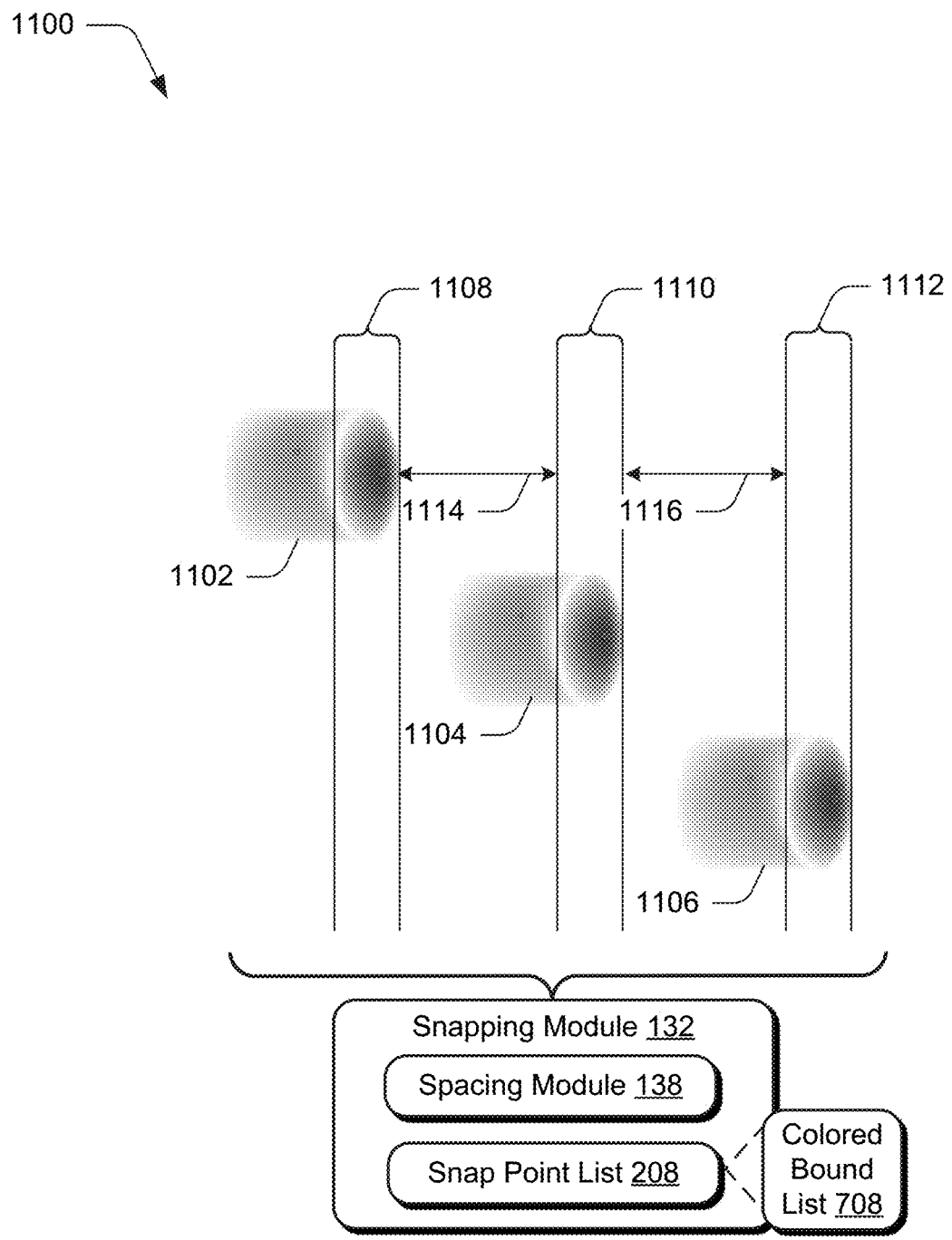
FIG. 11 depicts an example implementation in which a spacing module is used as a mesh art positioning technique as part of digital content creation based on a boundary of diffused color within respective items of mesh art.

FIG. 11 depicts an example implementation 1100 in which a spacing module 138 is used as a mesh art positioning technique as part of digital content 106 creation based on a boundary of diffused color within respective items of mesh art. In this example, first, second, and third items of mesh art 1102, 1104, 1106 are also included in a user interface and selected via user input, e.g., by a "control-click," click-and-drag, and so forth.

A user input is then received by the spacing module 138 to space the items of mesh art 1102, 1104, 1106 horizontally based on respective boundaries 1108, 1110, 1112 of diffused color. The spacing module 138 then repositions one or more of the items of mesh art 1102, 1104, 1106 to achieve this spacing 1114, 1116. Other examples are also contemplated, including vertical spacing. In this way, the snap point list 208 provides additional options for the snapping module 132 over conventional techniques to snap, align, or space mesh art in relation to other objects, which may also be configured as mesh art.

Example System and Device

Figure 12:
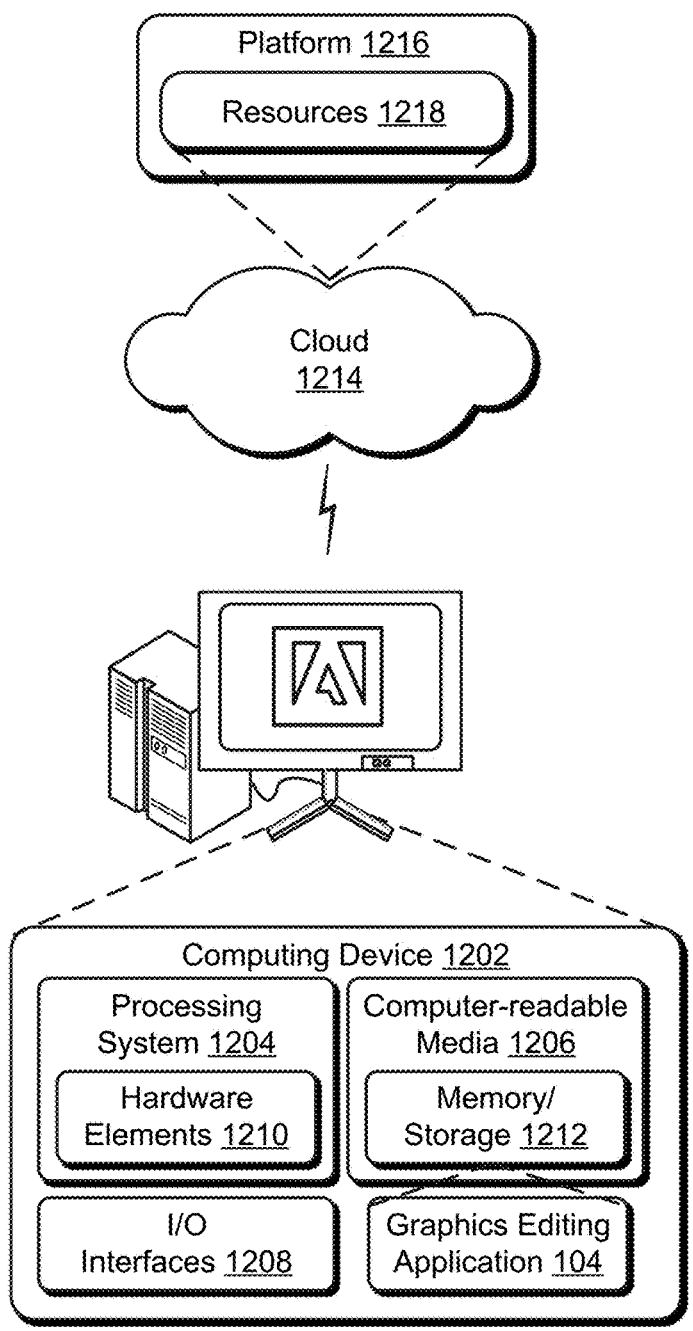
FIG. 12 illustrates an example system including various components of an example device that can be implemented as any type of computing device as described and/or utilized with reference to FIGS. 1-11 to implement embodiments of the techniques described herein.

FIG. 12 illustrates an example system generally at 1200 that includes an example computing device 1202 that is representative of one or more computing systems and/or devices that may implement the various techniques described herein. This is illustrated through inclusion of the graphics editing application 104. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to render an item of digital content that includes mesh art, a method implemented by a computing device, the method comprising:
   obtaining, by the computing device, data that describes a plurality of vertices of mesh art within an item of digital content;
   determining, by the computing device, from the data a first vertex from the plurality of vertices associated with a source of diffused color and a second vertex from the plurality of vertices associated with a boundary of the diffused color within a border in the mesh art;
   generating, by the computing device, a snap point list to include the first vertex and the second vertex;
   receiving, by the computing device, a user input involving interaction of the mesh art with an object included within the item of digital content;
   determining, by the computing device, a relationship involving spacing in a user interface between the object and the mesh art based on one second vertex of the mesh art from the snap point list; and
   rendering, by the computing device, the digital content in the user interface based on the relationship between the object and the mesh art as having the spacing.

2. The method as described in claim 1, wherein the relationship is based at least in part on a color boundary list that describes the boundary of diffused color in the plurality of vertices within the border of the mesh art.

3. The method as described in claim 2, wherein the relationship of the object to the mesh art is based at least in part on the boundary.

4. The method as described in claim 1, wherein:
the determining from the data which of the plurality of vertices are assigned a color includes determining the source of the diffused color in the mesh art as one of the plurality of vertices; and
the determining of the relationship is based at least in part on the source.

5. The method as described in claim 1, wherein the obtaining is performed responsive to receipt of a user input involving selection of the mesh art or the object via the user interface.

6. The method as described in claim 1, wherein the determining of the relationship includes determining an alignment between the object and the mesh art based on the snap point list.

7. The method as described in claim 6, wherein the relationship causes snapping at least one of the object or the mesh art to a location in the user interface based on the snap point list as part of the rendering.

8. The method as described in claim 6, wherein the relationship causes rendering of at least one visual guide in the user interface indicating the relationship between the object and the mesh art.

9. The method as described in claim 1, wherein the object is another item of mesh art.

10. The method as described in claim 1, wherein the generating of the snap point list includes vertices of the plurality of vertices that are assigned a respective color and does not include vertices of the plurality of vertices that are not assigned a respective color.

11. In a digital medium environment to control rendering of an item of digital content that includes mesh art, a system comprising:
a mesh art collection module implemented at least partially in hardware of a computing device to obtain data, via a mesh art application programming interface (API), that describes a plurality of vertices of mesh art within the item of digital content;
a snap point list generation module implemented at least partially in hardware of the computing device to generate a snap point list including:
a snap point corresponding to a vertex from the plurality of vertices associated with a source of diffused color; and
a snap point corresponding to a vertex from the plurality of vertices associated with a boundary of the diffused color within a border of the mesh art;
a snapping module implemented at least partially in hardware of the computing device to determine a relationship, in a user interface based on the snap point list, between the at least one said vertex in the mesh art and an object included within the item of digital content; and
a digital content rendering module implemented at least partially in hardware of the computing device to render at least one visual guide in the user interface to align the object to the at least one said vertex in the mesh art based at least in part on relationship.

12. The system as described in claim 11, wherein the snap point list generation module is further configured to determine from the data which of the plurality of vertices are assigned a color and the generation of the snap point list is based at least in part on the determination.

13. The system as described in claim 11, wherein:
the snap point list generation module is further configured to determine the source of the diffused color in the mesh art as the vertex; and
the snapping module is further configured to determine the relationship based at least in part on the source.

14. The system as described in claim 11, wherein the determined relationship includes a spacing between the object and the mesh art in the user interface based on the snap point list.

15. The system as described in claim 11, wherein the determined relationship includes an alignment between the object and the mesh art based on the snap point list.

16. The system as described in claim 11, wherein the snapping module is further configured to determine the relationship based at least in part on a color bound list that describes the boundary of the diffused color in the plurality of vertices of the mesh art.

17. The system as described in claim 11, wherein the at least one visual guide indicates a location in the user interface to which the object or the mesh art is to be snapped when within a threshold distance.

18. The system as described in claim 17, wherein the at least one visual guide indicates a snapping line.

19. In a digital medium environment to render of an item of digital content that includes mesh art, a system comprising:
means for obtaining data that describes a plurality of vertices of mesh art within an item of digital content;
means for determining from the data which of the plurality of vertices are associated with a boundary of diffused color within a border of the mesh art in the mesh art;
means for generating a snap point list to include a vertex from the plurality of vertices that is associated with the boundary of the diffused color within the border of the mesh art;
means for determining a relationship between the mesh art and an object in the item of digital content based on the snap point list; and
means for rendering the digital content in a user interface as snapping the object or the mesh art to a location in the user interface based on the relationship.

20. The system as described in claim 19, where the determining means includes means for determining the relationship based at least in part on a color bound list that describes the boundary of the diffused color in the plurality of vertices within the border of the mesh art.

* * * * *

UNITED STATES PATENT AND TRADEMARK OFFICE
CERTIFICATE OF CORRECTION

PATENT NO. : 10,586,361 B2  
APPLICATION NO. : 15/852536  
DATED : March 10, 2020  
INVENTOR(S) : Avadhesh Kumar Sharma and Ashish Ranjan Page 1 of 1

It is certified that error appears in the above-identified patent and that said Letters Patent is hereby corrected as shown below:

In the Claims

Column 14, Line 56, after "based on", delete "one", insert -- the --, therefor.

Signed and Sealed this  
Twelfth Day of May, 2020

Andrei Iancu  
*Director of the United States Patent and Trademark Office*